(12) United States Patent
Ohashi

(10) Patent No.: US 8,184,245 B2
(45) Date of Patent: May 22, 2012

(54) OPTICAL COMPENSATION FILM FOR VA-MODE LIQUID CRYSTAL DISPLAY DEVICE AND VA-MODE LIQUID CRYSTAL DISPLAY DEVICE

(75) Inventor: Yusuke Ohashi, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 544 days.

(21) Appl. No.: 12/410,799

(22) Filed: Mar. 25, 2009

(65) Prior Publication Data
US 2009/0244440 A1   Oct. 1, 2009

(30) Foreign Application Priority Data
Mar. 31, 2008 (JP) .................................. 2008-092439

(51) Int. Cl.
*G02F 1/1335* (2006.01)
(52) U.S. Cl. .............................. 349/117; 349/61; 349/68
(58) Field of Classification Search .................. None
See application file for complete search history.

(56) References Cited

U.S. PATENT DOCUMENTS

| | | | |
|---|---|---|---|
| 6,642,981 B1 | 11/2003 | Ohmuro et al. | |
| 2006/0187180 A1 | 8/2006 | Park et al. | |
| 2008/0158483 A1 | 7/2008 | Saitoh et al. | |
| 2008/0158488 A1* | 7/2008 | Yanai et al. | 349/107 |
| 2008/0192192 A1* | 8/2008 | Toyama et al. | 349/117 |
| 2008/0204644 A1* | 8/2008 | Toyama et al. | 349/118 |
| 2009/0231518 A1* | 9/2009 | Sekiguchi et al. | 349/96 |

FOREIGN PATENT DOCUMENTS

| | | |
|---|---|---|
| CN | 101068858 A | 11/2007 |
| JP | 10-153802 A | 6/1998 |
| JP | 2003-140110 A | 5/2003 |
| JP | 2004-212798 A | 7/2004 |
| JP | 2006-091083 | 4/2006 |
| JP | 2006-228576 | 8/2006 |
| JP | 2006-237565 A | 9/2006 |
| JP | 2006-268033 | 10/2006 |
| JP | 2006-339047 A | 12/2006 |
| JP | 2008-258094 | 10/2008 |
| WO | WO 2006/011450 | 2/2006 |

OTHER PUBLICATIONS

Official Action dated Feb. 14, 2012 issued in corresponding Japanese Patent Application No. 2008-092439 with English Translation.
Official Action dated Feb. 29, 2012 issued in corresponding Chinese Patent Application No. 200910132919.5 with English Translation.

* cited by examiner

*Primary Examiner* — Michelle R Connelly Cushwa
(74) *Attorney, Agent, or Firm* — Buchanan Ingersoll & Rooney PC

(57) ABSTRACT

An optical compensation film to be used in a VA mode liquid crystal display device, having retardation in plane at a wavelength of 550 nm, Re(550), falling within the range from 20 to 100 nm, and retardation along thickness direction at a wavelength of 550 nm, Rth(550), falling within the range from 60 to 120 nm, is disclosed. And a VA-mode liquid crystal display device having the optical compensation film, disposed between the liquid crystal cell and each of the pair of polarizing elements, is disclosed.

10 Claims, 12 Drawing Sheets

(a)

(b)

OPTICAL COMPENSATION FILM FOR VA-MODE LIQUID CRYSTAL DISPLAY DEVICE AND VA-MODE LIQUID CRYSTAL DISPLAY DEVICE

CROSS-REFERENCE TO RELATED APPLICATIONS

This application claims benefit of priority under 35 U.S.C. 119 to Japanese Patent Application No. 2008-092439 filed on Mar. 31, 2008, which is expressly incorporated herein by reference in its entirety.

BACKGROUND OF THE INVENTION

1. Technical Field

The present invention relates to an optical compensation film for VA-mode liquid crystal display device and a VA-mode liquid crystal display device.

2. Background Art

Various improvements of VA (Vertically Aligned) mode liquid crystal display devices have been proposed. For example, in JPA No. H10-153802, a VA mode-liquid crystal display device, which is optimized in terms of viewing angle characteristics or contrast, is proposed.

However, the displaying properties of liquid crystal displays are expected to be optimized in terms of not only viewing angle characteristics and contrast but also gray scale characteristics. The gray scale property is one of the factors determining the color reproduction ability, and, especially in displaying color images, may be important for determining the order of superiority of displaying-qualities. Previously, regarding VA-mode liquid crystal display devices, studies for improving the displaying-properties have been made mainly focusing on lowering the brightness in the black state, or in other words, mainly focusing on contrast, and have been made rarely focusing on the gray scale property.

SUMMARY OF THE INVENTION

The present inventor of the invention conducted various studies, and as a result, he found that the direction for optimizing VA-mode liquid crystal display devices in terms of the gray scale is not same as the direction for optimizing VA-mode liquid crystal display devices in terms of the viewing-angle characteristics or contrast, and that any conventional optical compensation films may not improve the gray scale property without lowering the viewing-angle characteristics or contrast.

One object of the invention is to provide a novel optical compensation film contributing to improvements in gray scale property of a VA-mode liquid crystal display device without lowering the viewing-angle characteristics and contrast.

Another object of the invention is to provide a VA-mode liquid crystal display device having good displaying-properties which are balanced in terms of viewing-angle characteristics, contrast and gray scale property.

The means for achieving the objects are as follows.

[1] An optical compensation film to be used in a VA mode liquid crystal display device, having retardation in plane at a wavelength of 550 nm, Re(550), falling within the range from 20 to 100 nm, and retardation along thickness direction at a wavelength of 550 nm, Rth(550), falling within the range from 60 to 120 nm.

[2] The optical compensation film according to [1], wherein a difference, $\Delta Re_{630-450}$, between retardation in plane at 630 nm, Re(630), and retardation in plane at 450 nm, Re(450), is from −10 nm to 10 nm; and a difference, $\Delta Rth_{630-450}$, between retardation along thickness direction at 630 nm, Rth(630), and retardation along thickness direction at 450 nm, Rth(450), is from −12 nm to 12 nm.

[3] A VA-mode liquid crystal display device comprising:
a pair of polarizing elements;
a liquid crystal cell disposed between the pair of polarizing elements; and
an optical compensation film according to [1] or [2], disposed between the liquid crystal cell and each of the pair of polarizing elements.

[4] The VA-mode liquid crystal display device according to [3], wherein the liquid crystal cell is a multi-domain liquid crystal cell.

[5] The VA-mode liquid crystal display device according to [3], wherein the liquid crystal cell is a multi-domain liquid crystal cell with eight domains per one pixel.

[6] The VA-mode liquid crystal display device according to any one of [3] to [5], wherein the liquid crystal cell has a multi-gap structure

[7] The VA-mode liquid crystal display device according to any one of [3] to [6], further comprising a backlight unit outside of one of the pair of polarizing elements, wherein the backlight unit is a directly-beneath type backlight unit comprising:
a light emission surface,
a plurality of light sources placed below the light emission surface, and
light emission spectrum setting means for separately setting light emission spectra in a front direction which is parallel to the normal line direction relative to the light emission surface and in an oblique direction which is inclined at a predetermined angle from the normal line direction.

[8] The VA-mode liquid crystal display device according to [7], wherein
the plurality of light sources are a plurality of LED light sources different in light emission color, each comprising a first light source with the front direction as an optical axis of emission light and a second light source with the oblique direction as the optical axis of emission light; and
the light emission spectrum setting means changes the emission intensity for the second light source for each light emission color.

[9] The VA-mode liquid crystal display device according to [8], wherein
each of the second light source has the optical axis of emission light, the optical axis being set in a direction which is inclined by a predetermined angle against the front direction and is in a plane parallel to the front direction.

[10] The VA-mode liquid crystal display device according to [8] or [9], wherein a backlight unit comprises a plurality of multi-directional irradiation units each having the LED elements of the first light source and the second light source combined in one are dispersed below the light emission surface.

[11] The VA-mode liquid crystal display device according to [10], wherein the multi-directional irradiation units of each of light emission colors are placed like a lattice.

[12] The VA-mode liquid crystal display device according to any one of [7] to [11], wherein the light emission surface is divided into blocks, and wherein
said light emission spectrum setting means sets the emission intensity of the first and second light sources contained in each of the blocks separately for each block.

BRIEF DESCRIPTION OF THE DRAWINGS

FIG. 4 (a) is a schematic representation to show the irradiation state of the multi-directional irradiation unit shown in FIG. 3 relative to one color and FIG. 4(b) is a schematic representation to show an emission intensity distribution of the multi-directional irradiation unit;

Figure 1:
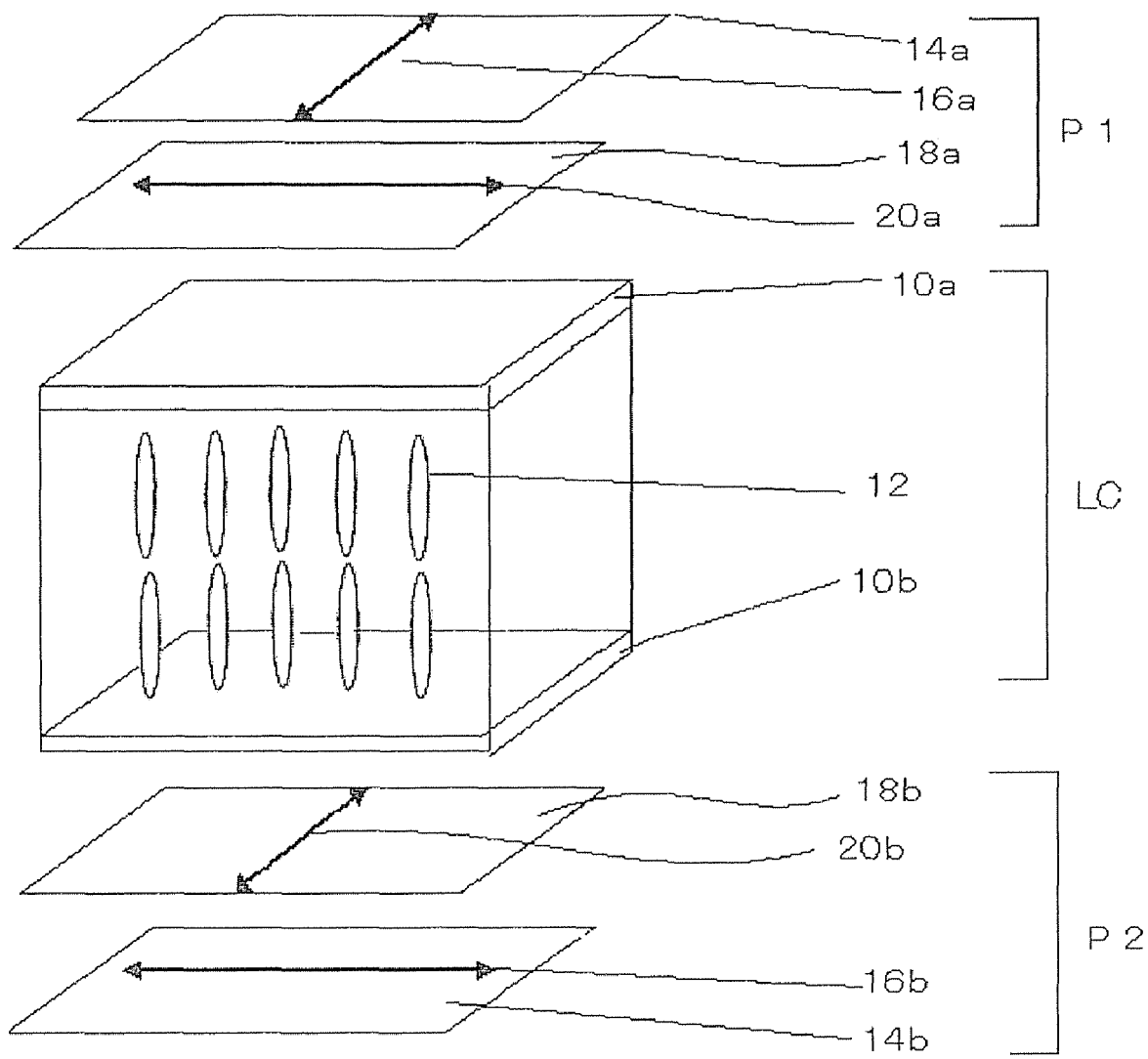
FIG. 1 is a conceptual outline view of one example of a VA-mode liquid-crystal display device of the invention.

In the drawings, the reference numerals have the following meanings:

10a and 10b substrates of liquid-crystal cell
12 Liquid-crystal layer (liquid-crystal molecules)
14a and 14b Polarizing elements
16a and 16b Transmission axes
18a and 18b Optical compensation films (the invention)
20a and 20b In-plane slow axes of Optical compensation films
47 Light emission surface
53 Emission intensity setting section (light emission spectrum setting means)
57 Front direction
59 Oblique direction
61 Multi-directional irradiation unit
63 First light source
65 Second light source
71 Plane parallel to front direction
83 Block
100 Liquid crystal display
200 Backlight unit

DETAILED DESCRIPTION OF THE INVENTION

The invention is described in detail hereinunder. In this description, the numerical range expressed by the wording "a number to another number" means the range that falls between the former number indicating the lowermost limit of the range and the latter number indicating the uppermost limit thereof.

First of all, the terms to be used in the description will be explained.

[Definitions of Re and Rth]

In the description, $Re(\lambda)$ (unit: nm) and $Rth(\lambda)$ (unit: nm) each indicate retardation in plane and retardation along thickness direction of a sample, a film or the like, at a wavelength $\lambda$. $Re(\lambda)$ is measured by applying a light having a wavelength of $\lambda$ nm in the normal direction of the film, using KOBRA-21ADH or WR (by Oji Scientific Instruments).

When a film to be tested is represented by an uniaxial or biaxial refractive index ellipsoid, then its $Rth(\lambda)$ is calculate according to the method mentioned below.

With the in-plane slow axis (determined by KOBRA 21ADH or WR) taken as the inclination axis (rotation axis) of the film (in case where the film has no slow axis, the rotation axis of the film may be in any in-plane direction of the film), $Re(\lambda)$ of the film is measured at 6 points in all thereof, up to +50° relative to the normal direction of the film at intervals of 10°, by applying a light having a wavelength of $\lambda$ nm from the inclined direction of the film.

With the in-plane slow axis from the normal direction taken as the rotation axis thereof, when the film has a zero retardation value at a certain inclination angle, then the symbol of the retardation value of the film at an inclination angle larger than that inclination angle is changed to a negative one, and then applied to KOBRA 21ADH or WR for computation.

With the slow axis taken as the inclination axis (rotation axis) (in case where the film has no slow axis, the rotation axis of the film may be in any in-plane direction of the film), the retardation values of the film are measured in any inclined two directions; and based on the data and the mean refractive index and the inputted film thickness, Rth may be calculated according to the following formulae (1) and (2):

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \quad (1)$$

$$Rth = \{(nx + ny)/2 - nz\} \times d \quad (2)$$

wherein $Re(\theta)$ means the retardation value of the film in the direction inclined by an angle $\theta$ from the normal direction; nx means the in-plane refractive index of the film in the slow axis direction; ny means the in-plane refractive index of the film in the direction vertical to nx; nz means the refractive index of the film vertical to nx and ny; and d is a thickness of the film.

When the film to be tested can not be represented by a monoaxial or biaxial index ellipsoid, or that is, when the film does not have an optical axis, then its $Rth(\lambda)$ may be calculated according to the method mentioned below.

With the in-plane slow axis (determined by KOBRA 21ADH or WR) taken as the inclination axis (rotation axis) of the film, $Re(\lambda)$ of the film is measured at 11 points in all thereof, from -50° to +50° relative to the normal direction of the film at intervals of 10°, by applying a light having a wavelength of $\lambda$ nm from the inclined direction of the film. Based on the thus-determined retardation data of $Re(\lambda)$, the mean refractive index and the inputted film thickness, $Rth(\lambda)$ of the film is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

The mean refractive index and the film thickness are inputted in KOBRA 21ADH or WR, nx, ny and nz are calculated therewith. From the thus-calculated data of nx, ny and nz, Nz=(nx−nz)/(nx−ny) is further calculated.

[Optical Compensation Film]

The present invention relates to an optical compensation film having Re(550) of falling within the range from 20 to 100 nm, and Rth(550) falling within the range from 60 to 120 nm. The optical compensation film may contribute to improving the gray scale property of a VA-mode liquid crystal display device without lowering the viewing-angle characteristics and contrast. From the same viewpoint, preferably, Re(550) is from 30 to 90 nm, and more preferably from 40 to 80 nm; and preferably, Rth(550) is from 70 to 110 nm, and more preferably from 80 to 100 nm.

Furthermore, in terms of reducing the color shift observed in oblique directions of a VA-mode liquid crystal display in the black state, preferably, Re and Rth of the optical compensation film for the visible light is constant, and more specifically, the difference, $\Delta Re_{630-450}$, between Re(630) and Re(450) is preferably from −10 to 10 nm; and the difference, $\Delta Rth_{630-450}$, between Rth(630) and Rth(450) is preferably from −12 to 12 nm. More preferably, $\Delta Re_{630-450}$ is from −7 to 7 nm and even more preferably from −5 to 5 nm. And, more preferably, $\Delta Rth_{630-450}$ is from −10 to 10 nm and even more preferably from −8 to 8 nm.

The optical compensation film of the invention is not specifically defined in terms of its materials, so far as they satisfy the above-mentioned requirements. The optical compensation film of the invention is not specifically defined in terms of a process of producing it; and films prepared according to any method such as a solvent casting method and a melt extrusion method may be used as the optical compensation film of the invention. Regarding the material for the polymer film, preferred are polymers excellent in the optical properties, transparency, mechanical strength, thermal stability, water shieldability and isotropy; however any material satisfying the above-mentioned conditions may be used herein. For example, examples of the material include polycarbonate polymers; polyester polymers such as polyethylene terephthalate and polyethylene naphthalate; acrylic polymers such as polymethyl methacrylate; styrenic polymers such as polystyrene and acrylonitrile/styrene copolymer (AS resin); etc. As examples of the material, also mentioned are polyolefins such as polyethylene and polypropylene; polyolefinic polymers such as ethylene/propylene copolymer; vinyl chloride-based polymers; amide polymers such as nylon and aromatic polyamide; imide polymers, sulfone polymers, polyether sulfone polymers, polyether ether ketone polymers, polyphenylene sulfide polymers, vinylidene chloride polymers, vinyl alcohol polymers, vinyl butyral polymers, arylate polymers, polyoxymethylene polymers, epoxy polymers; and mixtures of the above-mentioned polymers.

Other preferable examples include thermoplasticity norbornene base polymers such as Nippon Zeon's ZEONEX, ZEONOR; JSR's ARTON; etc.

Other preferable examples of the material to form the polymer film include cellulose base polymers (this is referred to as cellulose acylate) heretofore generally used as a transparent protective film for polarizing plates. Representative examples of the cellulose acylate to be used for preparing the optical compensation film include triacetyl cellulose. A cellulose as a raw material for cellulose acylate is a cotton linter, a wood pulp (a needle leaf tree pulp or a broad leaf tree pulp), or the like. Cellulose acylate obtained from any raw material cellulose can be used. A plurality of raw material celluloses may be mixed as required. The raw material cellulose described in, for example, Maruzawa & Uda, Plastic Material Lecture (17) Cellulosic Resin, by Nikkan Kogyo Shinbun (1970); and Hatsumei Kyokai's Disclosure Bulletin No. 2001-1745 (pp. 7-8), can be used. There is no specific limitation on the raw material for the cellulose acylate film.

The degree of substitution of cellulose acylate means the ratio of acylation for three hydroxyl groups in a cellulose unit ((β) 1,4-glycoside bonded glucose). The degree of substitution (the ratio of acylation) can be determined based on the amount of fatty acids combining with a cellulose unit. The measurement is carried out according to the method described in ASTM: D-817-91.

Preferred examples of the cellulose acylate to be used for preparing the optical compensation film include cellulose acetates having the degree of acetyl-substitution falling within the range from 2.50 to 3.00. The degree of acetyl-substitution is more preferably 2.70 to 2.97.

The cellulose acylate has preferably a mass average degree of polymerization of 350 to 800, and more preferably a mass average degree of polymerization of 370 to 600. The cellulose acylate used in the present invention has preferably an average molecular weight of 70000 to 230000, more preferably 75000 to 230000, and still more preferably 78000 to 120000.

The cellulose acylate can be synthesized using an acid anhydride or an acid chloride as an acylation agent. In a synthesizing method which is most general in the industry, the cellulose obtained from cotton linter or wood pulp is esterified to a mixed organic acid component containing an organic acid (acetic acid, propionic acid, or butyric acid) corresponding to other acyl groups and an acetyl group, or acid anhydride (acetic acid anhydride, propionic acid anhydride, or butyric acid anhydride) to synthesize the cellulose ester.

The cellulose acylate film is preferably produced according to a solvent cast method. Examples of preparation of the cellulose acylate film according to the solvent cast method may include U.S. Pat. Nos. 2,336,310, 2,367,603, 2,492,078, 2,492,977, 2,492,978, 2,607,704, 2,739,069, and 2,739,070, British Patent Nos. 640731 and 736892, JPB Nos. syo 45-4554 and syo 49-5614, and JPA Nos. syo 60-176834, syo 60-203430, and syo 62-115035. The cellulose acylate film may be subjected to a stretching treatment. A method of stretching the cellulose acylate film and the condition thereof are disclosed in JPA Nos. syo 62-115035, hei 4-152125, hei 4-284211, hei 4-298310, and hei 11-48271.

For preparing films satisfying the conditions required for the optical compensation film of the invention, Re enhancer(s) and/or Rth enhancer(s) may be added to a polymer material to be used for preparing the films. "Re enhancer" as referred to herein is a compound having the property of developing birefringence in plane of film; and "Rth enhancer" as referred to herein is a compound having the property of developing birefringence along thickness direction of film. Preferable examples of the Re enhancer and Rth enhancer include rod-like compounds and discotic compounds such as those disclosed in JPA Nos. 2004-50516 and 2007-86748.

For controlling the wavelength dispersion characteristics of Re and Rth of the optical compensation film, agent(s) for controlling the wavelength dispersion characteristics may be added to a polymer material to be used for preparing the film. Examples of the agent for controlling the wavelength dispersion characteristics include UV absorbents such as oxybenzophenone compounds, benzotriazole compounds, salicylate compounds, benzophenone compounds, cyanoacrylate compounds, and nickel complex compounds. The agent is preferable selected from UV absorbents having an excellent ability to absorb UV rays having a wavelength of at most 370 nm, and those not almost absorbing visible light having a wavelength of at least 400 nm. Benzotriazoles are preferable since they cause little coloration. In addition, UV absorbents described in JPA Nos. 110-182621 and H8-337574, and UV absorbent polymers described in JPA No. H6-148430 are also preferably used herein.

The optical compensation film may be selected from laminates having a plurality of layers and satisfying the optical properties as a whole. Examples of such a laminate include any combinations of polymer films and any combinations of a polymer film and one or more optically anisotropic layer formed of a cured liquid crystal composition. The optically anisotropic layer may be prepared by using a discotic compound(s). Generally, a discotic compound shows an optical negative monoaxial property. The optically anisotropic layer in which molecules of the discotic compound are in a hybrid-alignment state is preferable. In the hybrid alignment, molecules of the discotic compound are aligned with a tilt angle, which is defined as an angle between a discotic face and film surface, varying along the thickness direction of the layer. The optical axis of a discotic molecule may exist in the normal line direction relative to the discotic face. And a refractive index in the discotic face direction of a discotic molecule may be higher than that in the optical axis discotic. The optically anisotropic layer is preferably prepared as follows. On the surface of the support such as a polymer film or the surface of the alignment layer formed of a polymer(s) such as polyvinyl alcohol formed thereon, molecules of a discotic compound(s) are aligned, and then cured in the alignment state. Preferably, curing the alignment state is carried out by polymerization.

Examples of a discotic liquid-crystalline compound include benzene derivatives described in "Mol. Cryst.", vol. 71, page 111 (1981), C. Destrade et al; truxane derivatives described in "Mol. Cryst.", vol. 122, page 141 (1985), C. Destrade et al. and "Physics lett. A", vol. 78, page 82 (1990); cyclohexane derivatives described in "Angew. Chem.", vol. 96, page 70 (1984), B. Kohne et al.; and macrocycles based aza-crowns or phenyl acetylenes described in "J. Chem. Commun.", page 1794 (1985), M. Lehn et al. and "J. Am. Chem. Soc.", vol. 116, page 2,655 (1994), J. Zhang et al. The polymerization of discotic liquid-crystalline compounds is described in JPA No. hei 8-27284.

The optically anisotropic layer may be prepared by applying a coating liquid containing a discotic compound(s) and, if necessary, other ingredient(s) such as polymerization initiator to the surface of an alignment layer. The thickness of the optically anisotropic layer is preferably from 0.5 to 100 µm, and more preferably from 0.5 to 30 µm.

The aligned discotic molecules may be cured in the state. Preferably, curing may be carried out by polymerization. Examples of the polymerization include thermal-polymerization employing a thermal-polymerization initiator(s) and photo-polymerization employing a photo-polymerization initiator(s). Photo-polymerization is preferable. The polymerization initiator may be selected from thermal polymerization initiators or photo-polymerization initiators. Photo-polymerization initiators are more preferable.

Examples of the photo-polymerization initiator include α-carbonyl compounds (those described in U.S. Pat. Nos. 2,367,661 and 2,367,670), acyloin ethers (those described in U.S. Pat. No. 2,448,828), α-hydrocarbon-substituted aromatic acyloin compounds (those described in U.S. Pat. No. 2,722,512), polynuclear quinone compounds (those described in U.S. Pat. Nos. 3,046,127 and 2,951,758), combinations of triarylimidazole dimer and p-aminophenyl ketone (those described in U.S. Pat. No. 3,549,367), acrydine and phenazine compounds (those described in Japanese Unexamined Patent Publication JPA No. Syouwa 60-105667 and U.S. Pat. No. 4,239,850), and oxadiazole compounds (those described in U.S. Pat. No. 4,212,970).

The amount of the polymerization initiator in the liquid crystal composition is preferably from 0.01 to 20 mass %, and more preferably from 0.5 to 10 mass % with respect to the total mass of the solid content when the composition is a coating liquid. UV rays are preferably used for the photoirradiation. The irradiation energy is preferably from 20 $mJ/cm^2$ to 50 $J/cm^2$, more preferably from 100 to 800 $mJ/cm^2$. For promoting the photopolymerization reaction, the photoirradiation may be effected under heat. A protective film may be formed on the optically anisotropic layer.

[VA Mode Liquid Crystal Display Device]

The present invention relates to also a VA-mode liquid crystal display device having the optical compensation film of the invention. A schematic outline view of one example of a liquid-crystal display device of the invention is shown in FIG. 1. The VA-mode liquid-crystal display device of FIG. 1 has a liquid-crystal cell LC (having substrates 10a and 10b and a liquid-crystal layer 12), and a pair of upper polarizing plate P1 and lower polarizing plate P2 disposed to sandwich the liquid-crystal cell LC therebetween. In general, a polarizing film is built in a liquid-crystal display device as a polarizing plate having a protective film on both surfaces thereof; but in FIG. 1, the outer protective film of the polarizing film is omitted for simplification. Between the upper substrate 10a and the upper polarizing film 14a, and between the lower substrate 10b and the lower polarizing film 14b, optical compensation films 18a and 18b, respectively, are disposed. The optical compensation films 18a and 18b satisfies above mentioned optical conditions; and they are equivalent to each other in terms of Re and Rth. The optical compensation films 18a and 18b are disposed so that their in-plane slow axes 20a and 20b each are orthogonal to the absorption axes 16a and 16b of the upper polarizing film 14a and the lower polarizing film 14b, respectively. Specifically, the optical compensation films 18a and 18b are disposed so that their slow axes are orthogonal to each other. In the embodiments wherein the optical compensation film 18a or 18b is a polymer film or has a polymer film, the optical compensation film 18a or 18b may serve also as protective film for the polarizing films 14a or 14b, respectively. A protective film may be disposed between the optical compensation film 18a or 18b and the polarizing film 14a or 14b, and, if the protective film is disposed, for example, an isotropy film of which retardation is substantially 0, such as a cellulose acylate film disclosed in JPA No. 2005-138375, is preferably used.

In the invention, any VA-mode liquid crystal cell can be used. Any basic VA-mode liquid crystal cells may be used. Especially, a multi-domain VA-mode (MVA-mode) liquid crystal cell is preferable in terms of improving the viewing angle characteristics. According to the VA-mode, in the off state, the LC molecules are perpendicularly aligned, hence no transmission after crossed polarizers, this is the black state. In the on state, the LC molecules tilt in a direction; and according to the MVA-mode, all of the LC molecules existing in one pixel don't tilt in a uniform direction, they tilt in plural directions differing from each other. For example, there have been known a 2-domain VA-mode cell wherein the LC molecules in one pixel tilt in two directions differing from each other, a four-domain VA-mode cell wherein the LC molecules in one pixel tilt in four directions differing from each other, and an eight-domain VA-mode cell wherein the LC molecules in one pixel tilt in eight directions differing from each other. Among these, a multi-domain (preferably eight-domain) VA-mode, disclosed in JPA No. 2004-302267, which can realize a half tone (HT) method, is preferable. More specifically, the preferable multi-domain structure is as follows. On the surface of a substrate, plural protrusions, dividing one pixel into multi domains, are formed at different intervals. By using a MVA-mode LC cell having such a substrate, it is possible to form multi domains per one pixel; and, in each domain, the LC molecules tilt in plural directions differing from each other and the threshold voltage, at which the LC molecules start to tilt, differs from each other, which can realize a HT method.

A VA-mode employing a multi-gap structure is also preferable. By using a multi-gap VA-mode LC cell, the cell gap may contribute to reducing the wavelength dispersion of birefringence of the cell, and then contribute to reducing the color shift in the black state. Regarding some of the optical compensation films, it is difficult to adjust the wavelength dispersion of Re and/or Rth thereof to the above mentioned preferable range; and therefore, in the embodiments employing such an optical compensation film, using a multi-gap VA mode LC cell is especially effective. Preferable examples of the multi-gap LC cell include liquid crystal cells having a smaller thickness for shorter wavelength-pixels, more specifically, liquid crystal cells of RGB pixels, having three thicknesses respectively corresponding to each R pixel, each G pixel and each B pixel and increasing in this order. Such a multi-gap LC cell may be prepared by varying the thickness of the layer formed on the substrate such as a color filter. For example, regarding a liquid crystal cell having a color filter, the preferable example may be prepared by forming each B layer, each G layer and each R layer of which thickness is thinner in this order.

The liquid crystal display device of the invention may have a backlight unit outside of the back-side polarizing plate (for example, Polarizing plate PL2 in FIG. 1). Preferably, the backlight unit to be used in the invention is a directly-beneath type backlight unit comprising:

a light emission surface, a plurality of light sources placed below the light emission surface, and light emission spectrum setting means for separately setting light emission spectra in a front direction which is parallel to the normal line direction relative to the light emission surface and in an oblique direction which is inclined at a predetermined angle from the normal line direction.

According to this backlight unit, it is made possible to separately set the light emission spectra in the front direction and the oblique direction by the light emission spectrum setting means, directivity and the emission intensity are controlled separately for each of R, G, and B colors, and it is made possible to adjust the chromaticity (spectrum) in the front direction and the oblique direction. Therefore, according to the embodiments employing this backlight unit, it is possible to more improve the gray scale property.

Figure 2:
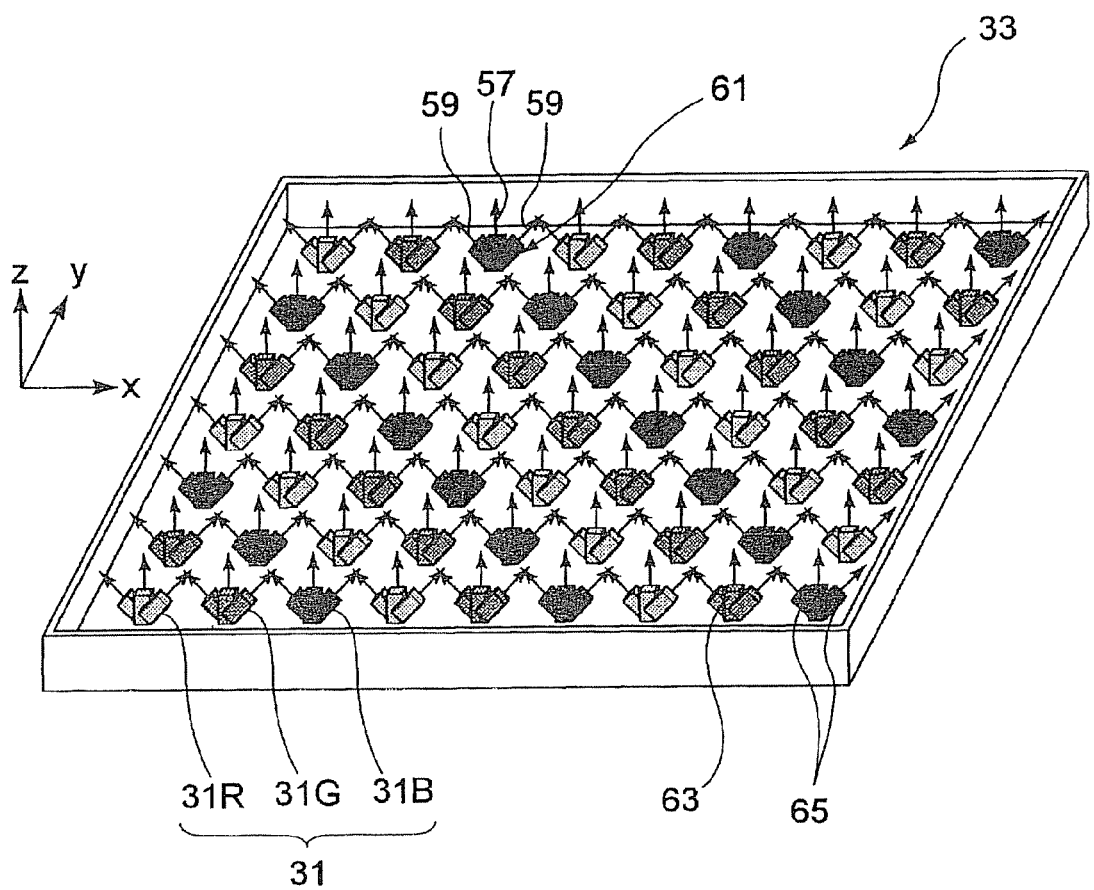
FIG. 2 is a conceptual perspective view of a light source section of a backlight unit which can be used in the invention.

One example of the backlight unit which can be used in the invention is, as shown in FIG. 2, backlight unit 200. The backlight unit 200 includes a light source section 33 having red LEDs 31R (see FIG. 2), green LEDs 31G (see FIG. 2), and blue LEDs 31B (see FIG. 2) placed alternately in the XY direction on a printed wiring board. The light source section 33 is provided with a diffusion plate, a diffusion sheet, and a prism sheet on the light emission side. Therefore, in the backlight unit 200, red light, green light, and blue light are emitted from the red LEDs 31R, the green LEDs 31G, and the blue LEDs 31B respectively included in the light source section 33, the red light, the green light, and the blue light emitted from the LEDs 31 are naturally mixed into white light while proceeding in the direction in which the diffusion plate and the diffusion sheet are provided, and the light lights the liquid crystal panel.

The backlight unit includes light emission spectrum setting means for separately setting light emission spectra in a front direction which is parallel to the normal line direction relative to the light emission surface and in an oblique direction which is inclined at a predetermined angle from the normal line direction. That is, it is made possible to separately set the light emission spectra in the front direction and the oblique direction by the control section and the emission intensity setting section, directivity and the emission intensity are controlled separately for each of R, G, and B colors, and it is made possible to adjust the chromaticity (spectrum) in the front direction and the oblique direction. Thus, in the embodiment, the light emission spectrum setting means is embodied in the combination of the control section and the emission intensity setting section.

In the backlight unit, a plurality of light sources are a plurality of LED light sources different in light emission color and each includes a first light source with the front direction as the optical axis of emission light and second light sources with the oblique direction as the optical axis of emission light for each light emission color. The light emission spectrum setting means makes it possible to change the emission intensity for each second light source for each light emission color. That is, the emission intensity of the LED light source oriented to the slanting direction 59 can be adjusted for each light emission color relative to the LED light source oriented to the front direction and the chromaticity (spectrum) in the front direction and the oblique direction can be adjusted relatively.

Multi-directional irradiation units 61 each having the first light source and the second light sources combined in one are placed, for example, like a lattice for each light emission color as shown in FIG. 2. While it is made possible to adjust the chromaticity (spectrum) in the front direction and the oblique direction according to each of the multi-directional irradiation units 61, a uniform light quantity distribution can be realized on the full face of the light emission surface. In addition, the multi-directional irradiation units 61 may be placed as random arrangement or staggered arrangement. In the random arrangement, periodical intensity unevenness is decreased and in the staggered arrangement, the number of the multi-directional irradiation units placed per unit area under the same illuminance can be reduced. The multi-directional irradiation units 61 may be arranged like a concentric circle. Further, the unit may be disassembled and the LED light sources of each color may be placed as dispersal arrangement as described later.

A specific configuration example of the multi-directional irradiation unit will be discussed.

Figure 3:
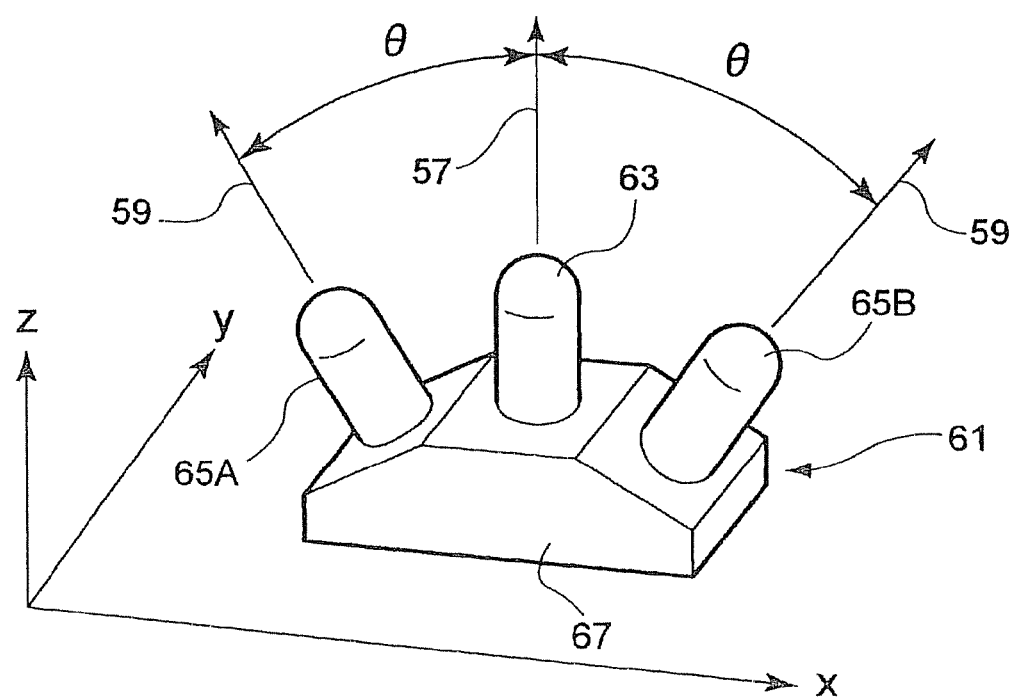
FIG. 3 is a perspective view as an example of a multi-directional irradiation unit shown in FIG. 2.

FIG. 3 is a perspective view as an example of the multi-directional irradiation unit shown in FIG. 2. In FIG. 3, "x-direction" corresponds to a vertical (upper-downward) direction of the screen and "y-direction" corresponds to a horizontal (right-left) direction of the screen.

The first light source 63 is implemented as a shell-shaped LED element placed with the optical axis of emission light (main axis) oriented to the front direction 57. The second light sources 65A and 65B are implemented as two shell-shaped LED elements each with the optical axis of emission light (main axis) set in a direction of a predetermined inclination angle θ from the front direction 57 in a plane parallel to the front direction 57 (zx plane). The shell-shaped LED element has a lens in an element tip part and emits light with directivity as the tip direction of the shell shape becomes high intensity. Thus, when it is viewed from right in front of the LED element emitting light, very bright light is emitted; on the other hand, light is scarcely emitted in a lateral direction.

In the embodiment, the multi-directional irradiation units 61 each having the first light source 63 and the second light sources 65 combined in one are dispersed below the light emission surface. In the multi-directional irradiation unit 61, the two second light sources 65A and 65B can be placed in the same plane at the predetermined inclination angle θ with the optical axis of emission light in the front direction 57 between, and adjustment of color allocation symmetrical on both end sides with the front direction 57 as the center is made possible. Accordingly, for example, it is made possible to control the chromaticity (spectrum) in a direction of any desired inclination angle θ with the front direction 57 as the center symmetrically in the zx plane and adjustment of color balance is facilitated.

According to the multi-directional irradiation unit 61 in one piece, power supply to the first light source 63 oriented to the front direction 57 and a pair of second light sources 65A and 65B oriented to the slanting direction 59 can be collected and the wiring structure is compacted.

Preferably, the inclination face azimuths of the second light sources 65A, 65B in the multi-directional irradiation units 61 are uniformed to one direction. That is, the direction in which the angle θ opens may be uniform in all units. The inclination angle θ need not necessarily be constant at all positions; if the angles are dispersed in a predetermined angle range, the intensity distribution is averaged and unevenness becomes hard to occur.

To incline the second light sources 65A and 65B, the light sources are attached to a base 67 having inclination faces as shown in the figure. In addition, a printed board may be inclined; the thickness of a copper film of the printed board may be inclined by etching or the shape of the board may be changed.

The second light sources 65A and 65B are two light sources oriented to the oblique slanting direction 59 as the basic configuration, but may be one light source. In this case, although the viewing angle is limited, the display screen of the liquid crystal display is often observed in an almost determined direction and the decreasing effect of intensity change when the observer shakes his or her head from side to side on the screen center side can be provided simply by inclining the optical axis to the screen center side. If the observer deviates largely from the usual state in such a manner that he or she sees the screen from the left or the right deviating largely from the screen center, light sources oriented to two directions are required.

The emission intensity distribution of the multi-directional irradiation unit will be discussed.

Figure 4:
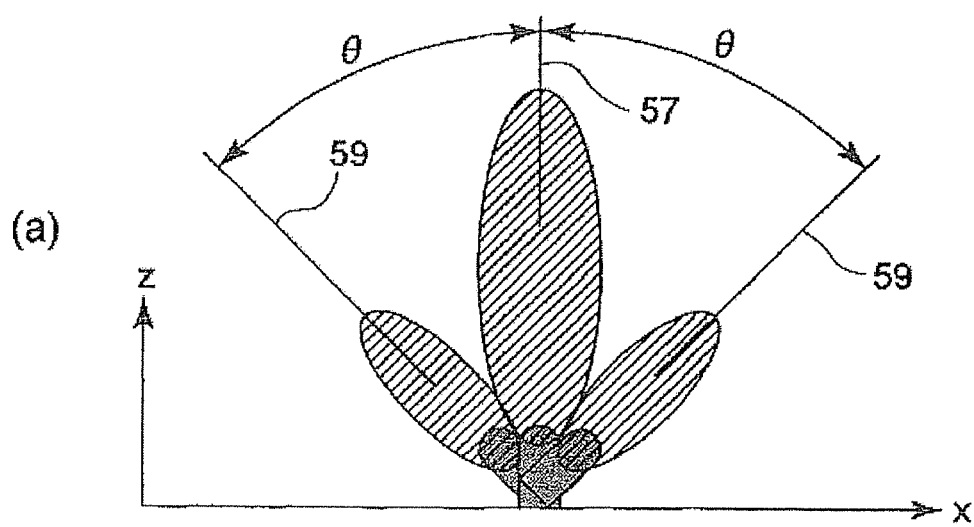
Figure 4:
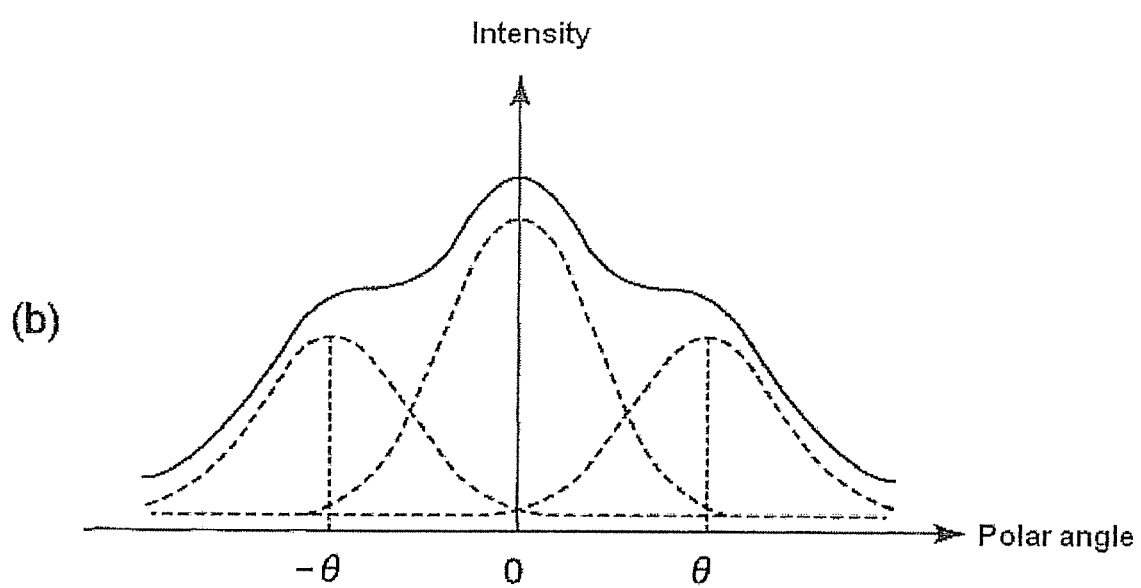

FIG. 4 (a) is a schematic representation to show the irradiation state of the multi-directional irradiation unit shown in FIG. 3 relative to one color and (b) is a schematic representation to show the emission intensity distribution of the multi-directional irradiation unit.

In the multi-directional irradiation unit 61, the second light sources 65A and 65B are each inclined at the predetermined angle θ with respect to the first light source 63 and the first light source 63 is caused to emit light at the intensity required for usual image display in the front direction 57 (namely, the direction parallel to the Z axis) as shown in FIG. 4 (a). Each of the second light sources 65A and 65B is caused to emit light at the intensity of about a half the intensity of the first light source 63. In this case, the emission intensity distribution synthesized in the multi-directional irradiation unit 61 in a single color becomes as indicated by the solid line in FIG. 4 (b). That is, the intensity reaches the maximum at polar angle 0° and also decreases with an increase or a decrease in the polar angle as the intensity distribution.

Generally, according to a VA mode liquid crystal panel, blue tint occurs when being observed in the oblique upper directions or in the oblique downward directions with polar angles, in the black state. It may be possible to eliminate the blue tint by adjusting each of the amounts of RGB lights.

Figure 5:
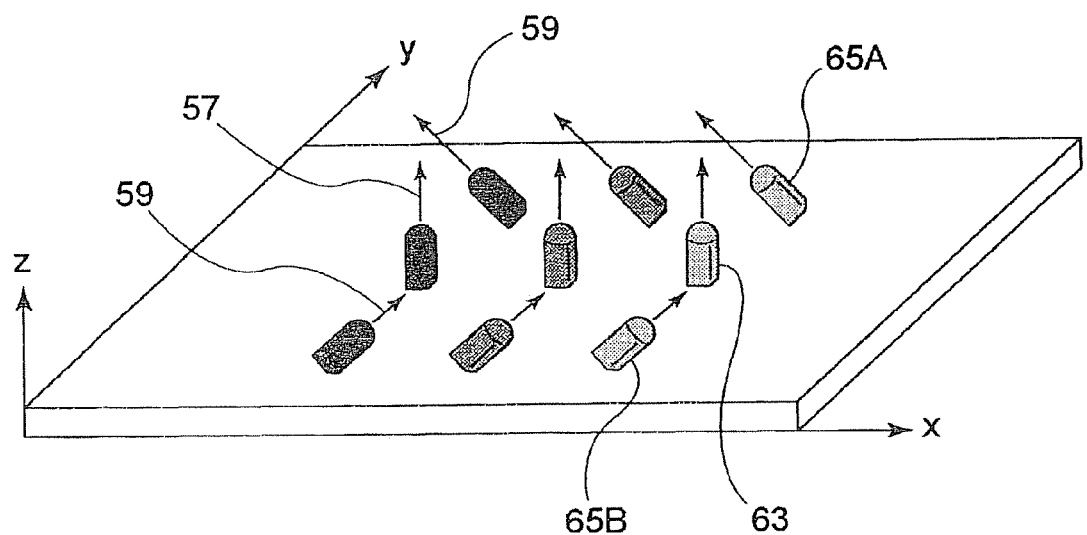
FIG. 5 is a perspective view of a modified example wherein the LED elements of first and second light sources are separately placed.

Specifically, in the multi-directional irradiation unit 61 of each color, the emission intensity setting section sets the emission intensity of blue color B lower about 80% than the emission intensities of red color and green color by lighting the second light source 65A (left) and the second light source 65B (right) as shown in FIGS. 5 (a) and (c). By setting the emission intensities in such a manner, the blue tint, occurring when being observed in the oblique upper directions or in the oblique downward directions, can be eliminated. On the other hand, as the first light source 63 (center) is lit, the emission intensity of each of the R, G, and B colors is set to 100%.

The emission intensity ratio can be adjusted according to any desired parameter of control of the applied current value (constant voltage drive), the applied voltage value (low current drive) to the light source section etc.

Therefore, as the whole of the backlight unit, the first light source 63 is lit to produce each color 100% for emitting white light; on the other hand, in the component in the oblique direction produced by the second light sources 65A and 65B, the intensity of the B color is lower than the R, G color as much as area $A_B$ and consequently the light emitted in the oblique direction 59 becomes irradiation light with weak blue color. That is, when the VA-mode liquid crystal panel is observed in the oblique directions, usually, blue tint occurs in the upper oblique directions and in the downward oblique directions with polar angles; however, according to the embodiment, the blue tint can be reduced by lowering the emission intensity of B light in the same directions.

The liquid crystal display device according to the embodiment is made up of main components of a backlight unit, a liquid crystal panel, and control means. The backlight unit has a plurality of light sources placed below a light emission surface and uses LEDs for emitting red light, green light, and blue light of the three primary colors of light as light sources, thereby mixing red light, green light, and blue light emitted from the LEDs to generate white light. The VA-mode liquid crystal panel shows a light transmission characteristic that the transmittance of B light is higher than that of R or G light in the upper or downward oblique directions (at polar angles). And, according to the embodiment, the B component emitted from the light source in the backlight unit is weakened in the oblique directions, and therefore the white light from which the blue tint in the oblique directions is eliminated may be observed.

Thus, according to the liquid crystal display of the embodiment, for the color component insufficient in the oblique direction, for example, in the proper light transmission characteristic caused by the optical compensation film of the liquid crystal panel, the light emission spectrum in the oblique direction is controlled individually for each of the R, G, and B colors, whereby the color allocation is adjusted. Accordingly, the viewing angle dependency of tint of a display image is improved and consequently if tint occurs according to the viewing angle characteristics of the liquid crystal panel, the color shift can be canceled for producing high-quality image display.

A modified example wherein the light sources are dispersed according to the light emission direction in place of the backlight unit described above will be discussed.

FIG. 5 is a perspective view of a modified example wherein the LED elements of the first and second light sources are separately placed. In FIG. 5, "x-direction" corresponds to a vertical (upper-downward) direction of the screen and "y-direction" corresponds to a horizontal (right-left) direction of the screen.

The first light source 63 and the second light sources 65A and 65B can also be disposed separately rather than in the multi-directional irradiation unit 61 in one described above. According to the configuration, the light sources are dispersed finely, so that the distance between the light sources is shortened and more even illumination light can be provided.

In the configurations of the backlight unit described above, the second light sources 65A and 65B are placed having an open angle of the predetermined inclination angle θ from the front direction.

Figure 6:
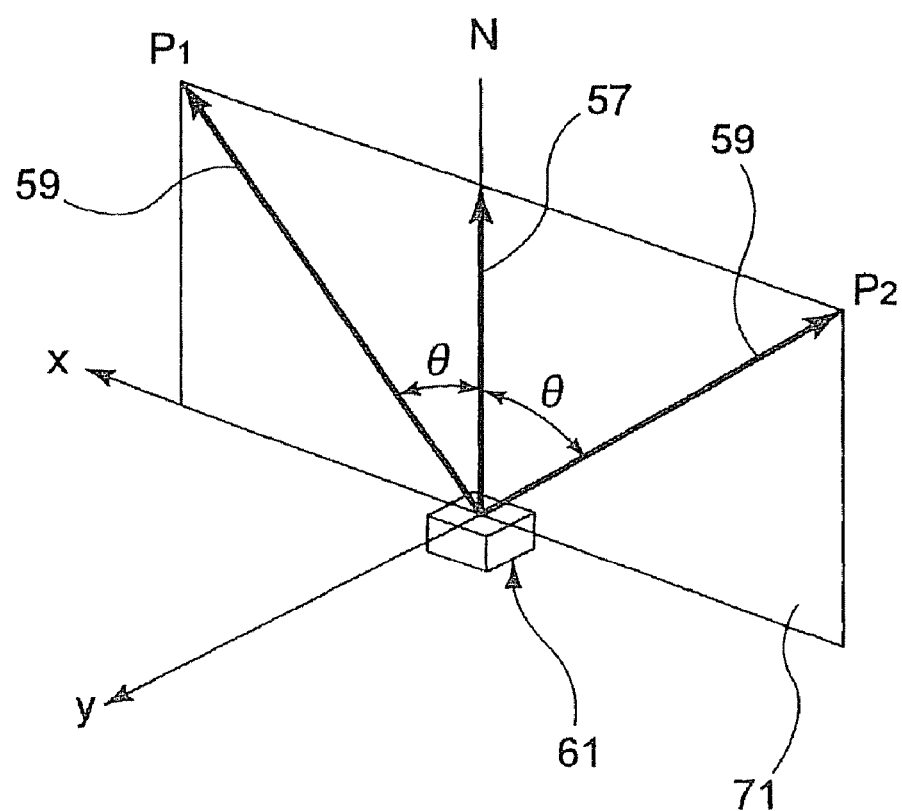
FIG. 6 is a schematic representation to show an optical axis in an oblique direction relative to a screen of a liquid crystal display device.

FIG. 6 is a schematic representation to show an optical axis in the oblique direction used with the VA-mode liquid crystal panel. In FIG. 6, "x-direction" corresponds to a vertical (upper-downward) direction of the screen and "y-direction" corresponds to a horizontal (right-left) direction of the screen.

For the VA-mode liquid crystal panel, it is known that color shift easily occurs in the upper and downward directions inclined 45° with respect to a normal direction N as shown in FIG. 6. Thus, the inclination angle of each of the second light sources 65A and 65B is set to 45° (or ranging from 40° to 50°), whereby the viewing angle dependency of tint of a display image caused by the optical compensation film of the VA-mode liquid crystal panel can be improved efficiently.

That is, the multi-directional irradiation unit may be configured so as to contain at least two LED light sources with the second light sources 65A and 65B having the optical axes of emission light set in directions P1 and P2 roughly equal in the inclination angle θ with the front direction 57 as the center in a plane 71 parallel to the front direction 57 (normal direction N). Accordingly, a phenomenon in which blue tint occurs on both end sides in the upper-downward direction of the screen in the black state, caused by the optical compensation film of the VA-mode liquid crystal panel can be eliminated.

Next, a modified example wherein the number of light emission directions in the oblique direction is increased will be discussed.

Figure 7:
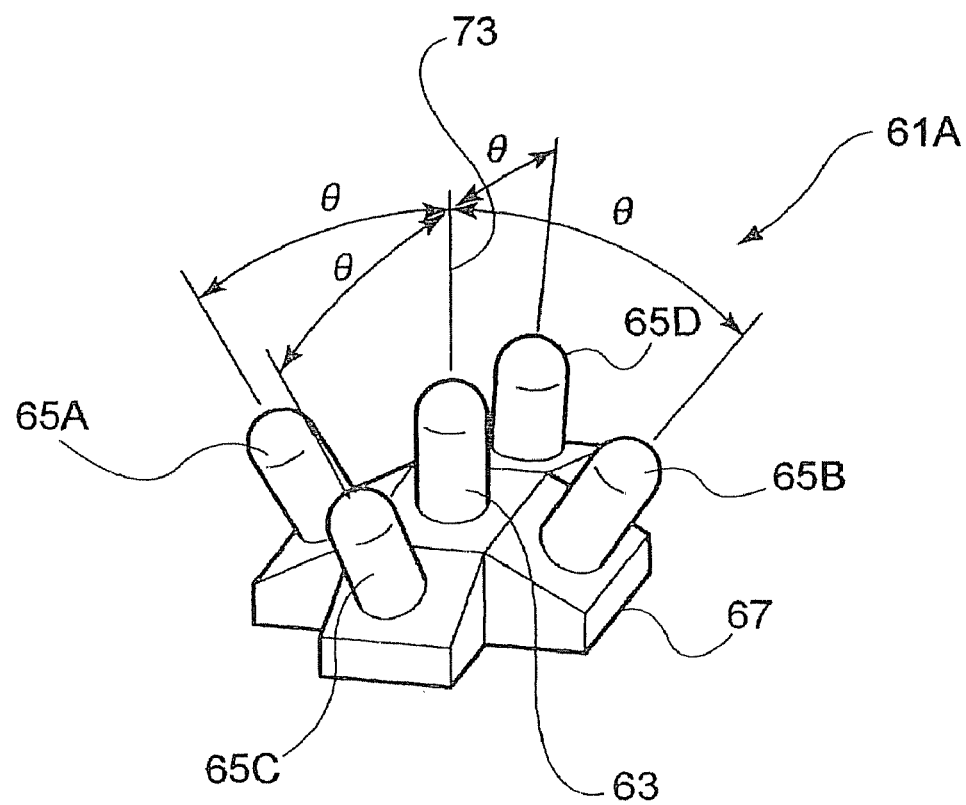
FIG. 7 is a perspective view of a modified example wherein LED elements are placed in an orthogonal direction.

FIG. 7 is a perspective view of a modified example wherein LED elements are placed in an orthogonal direction.

In the configuration example of the multi-directional irradiation unit shown in FIG. 3 described above, the second light sources 65A and 65B are inclined in one plane 71 parallel to the front direction 57 (see FIG. 10) relative to the first light source 63. In addition, a multi-directional irradiation unit 61A shown in FIG. 7 includes five LED elements in one body made up of a first light source 63 having a cross line of two planes orthogonal to each other as an optical axis 73 and a pair of second light sources 65A and 65B and a pair of second light sources 65C and 65D inclined at an inclination angle θ in their respective orthogonal planes with the first light source 63 as the center. The multi-directional irradiation unit 61A is applied to the backlight unit 200, whereby color shift for the viewing angle difference in the vertical direction of the display screen can be improved in addition to color shift for the viewing angle difference in the horizontal direction of the display screen; higher-quality image display is made possible. The azimuth angle of the horizontal direction of the screen being defined as 0°, preferably, the second light sources 65A to 65C are disposed at an azimuth angle of 45°, 135°, 225° and 315° respectively.

The types of LED elements will be discussed.

In the example described above, the shell-shaped LED elements are used, but the invention is not limited to the shell-shaped LED elements and can also be applied to any other type of LED element. The types of LED elements include not only the shell shape, but also a hat shape with a small lens part, a type with a lead of a recess, etc., provided by cutting the lens tip portion, a chip shape capable of providing high intensity, etc. Any type can be used as the LED light source of the invention.

Figure 8:
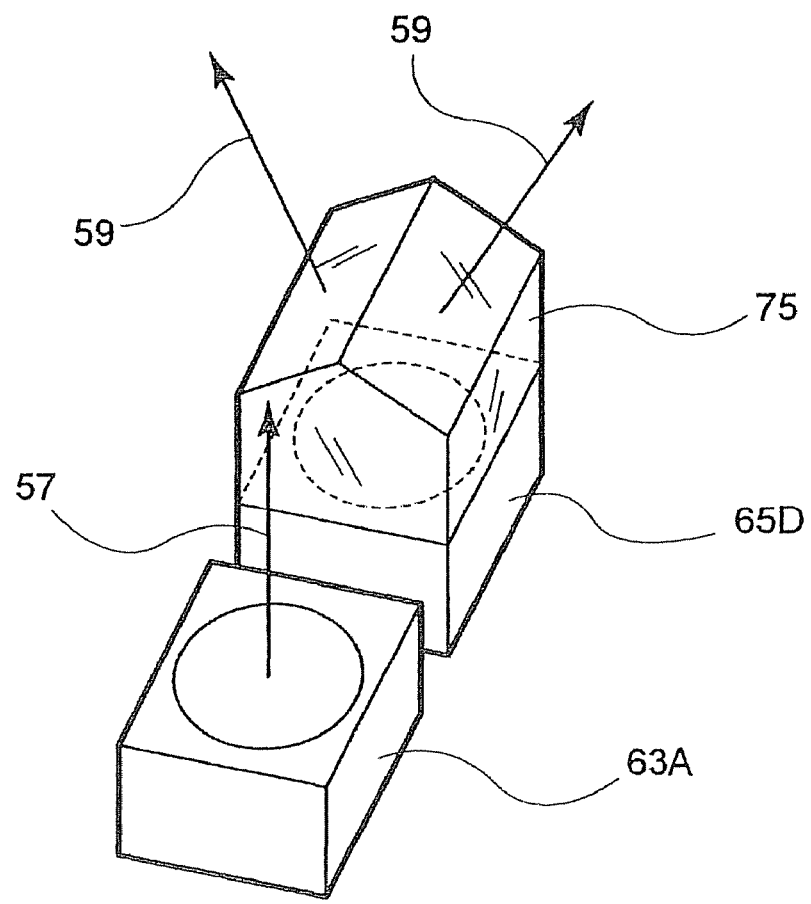
FIG. 8 is a perspective view to show the configuration wherein a prism is put on the light emission side of an LED element in an oblique direction.

As the LED element for emitting light in the light direction, a prism 75 for distributing light into two directions may be put on the light emission side of one LED element as shown in a perspective view of FIG. 8 in addition to use of two LED elements. In this case, the number of the LED elements can be decreased and the prism needs only to be placed in setting in the light emission direction and the assembling step can be simplified. In the example shown in the figure, the LED element is a chip shape LED element.

Next, the configuration wherein the liquid crystal panel is a VA (Vertically Aligned) liquid crystal panel will be discussed.

Figure 9:
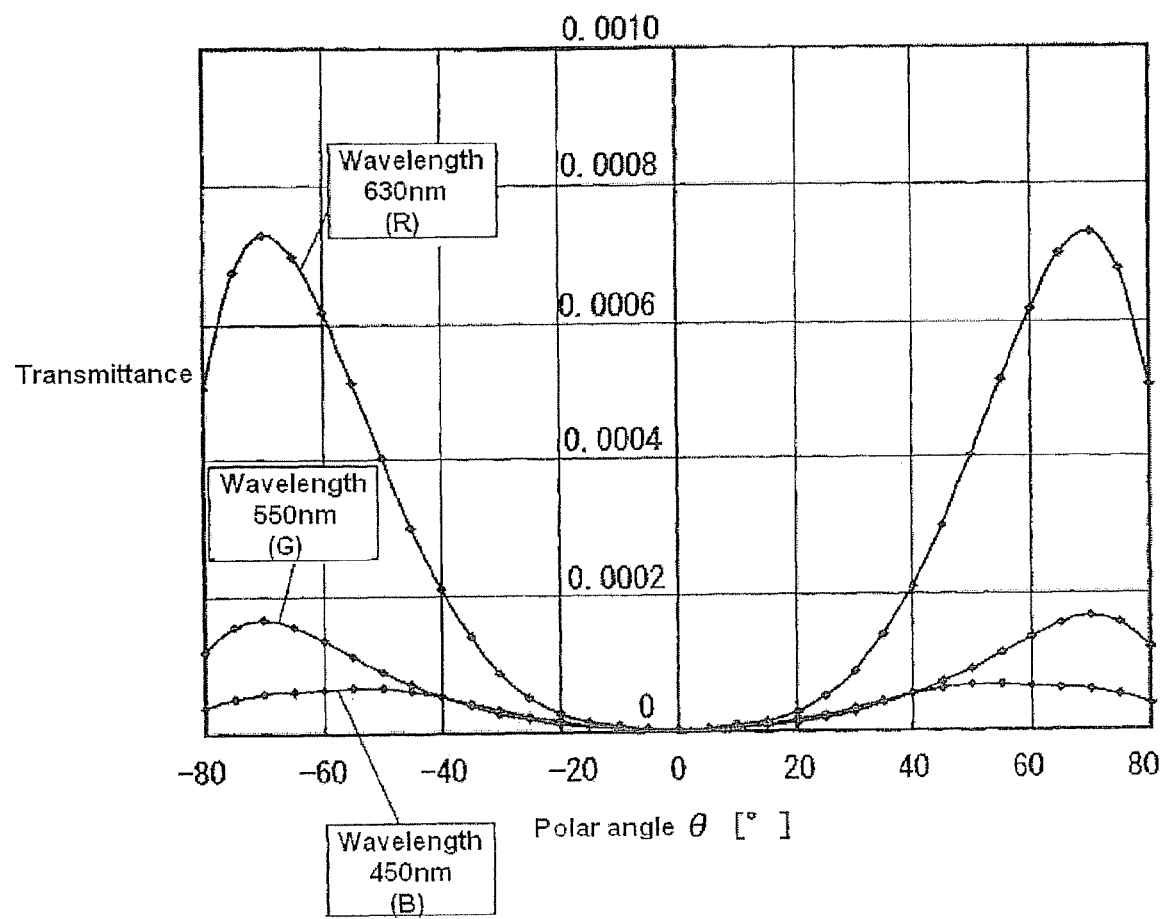
FIG. 9 is a graph to show the relationship of a light transmission characteristic with the polar angle of a VA-mode liquid crystal panel.
Figure 10:
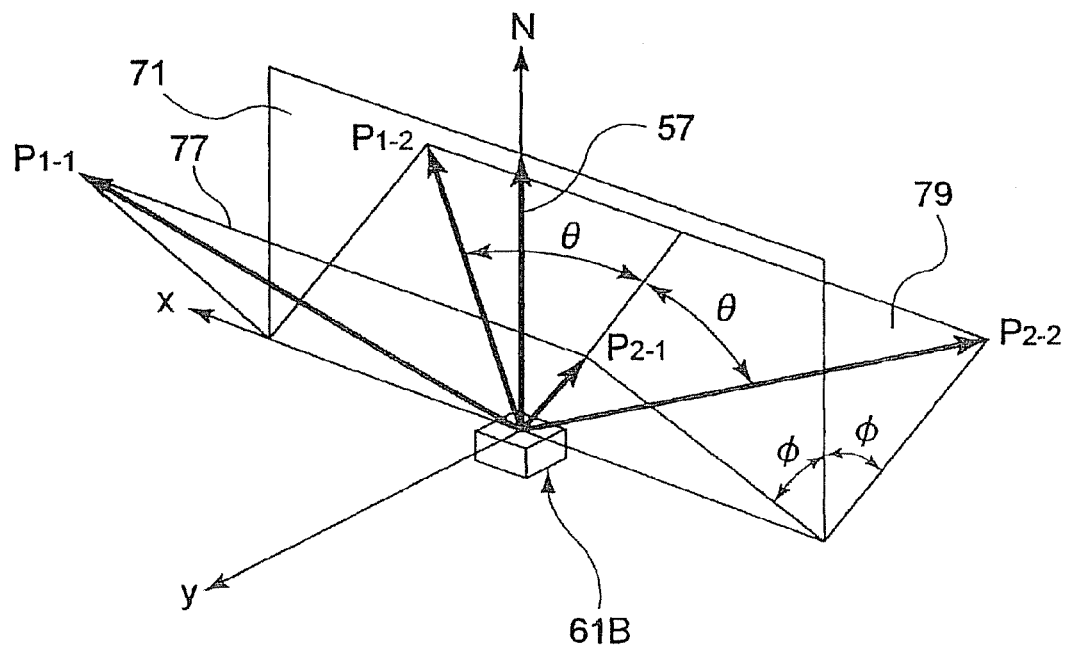
FIG. 10 is a schematic representation to show optical axes of a multi-directional irradiation unit which can be used in a VA-mode liquid crystal panel.

FIG. 9 is a graph to show the relationship of a light transmission characteristic with the polar angle of a VA-mode liquid crystal panel, and FIG. 10 is a perspective view to show optical axes of a multi-directional irradiation unit used with a VA-mode liquid crystal panel.

The VA liquid crystal panel has different transmission characteristics in R, G, and B colors relative to the polar axis, caused by a optical compensation film as shown in FIG. 9. Thus, a multi-directional irradiation unit 61B used with the VA liquid crystal panel has as optical axes of emission light, a total of four directions of second light sources provided by inclining two directions set to directions roughly equal in the inclination angle θ with the front direction 57 as the center in a first plane 71 parallel to the front direction 57 at an angle φ roughly equal in a direction orthogonal to the first plane 71 with the first plane 71 as the center as shown in FIG. 10.

That is, as the second light sources, at least four directions with the optical axes of emission light set in directions roughly equal in the inclination angle θ in inclination planes 77 and 79 inclined at the angle φ with the plane 71 parallel to the front direction 57 (normal direction N) between ($P_{1-1}$, $P_{1-2}$, $P_{2-1}$, and $P_{2-2}$) may be set as light emission directions. Accordingly, a phenomenon in which red tint (purplish red) occurs in the oblique direction at the black display time and a phenomenon in which blue tint occurs, observed in the VA liquid crystal can be eliminated.

Figure 11:
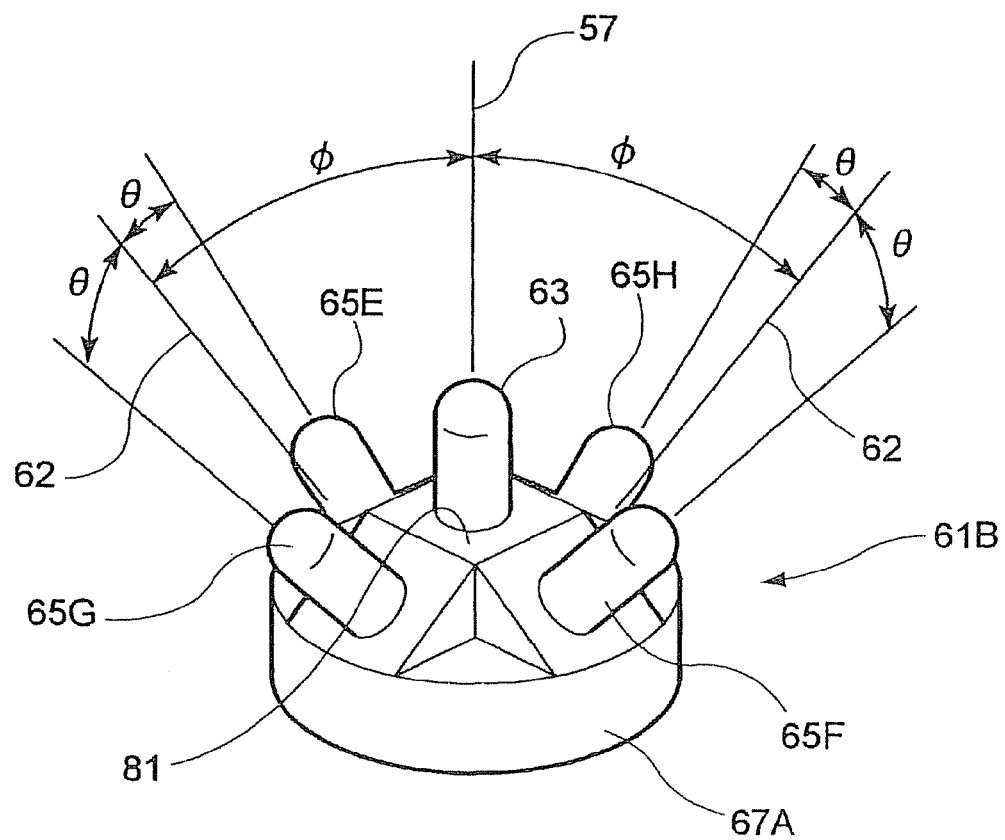
FIG. 11 is a perspective view to show a specific configuration example of a multi-directional irradiation unit for emitting light in a total of five directions of four oblique directions and the front direction.

FIG. 11 shows a specific configuration example of a multi-directional irradiation unit for emitting light in a total of five directions of the four oblique directions mentioned above and the front direction.

The multi-directional irradiation unit 61B used with the VA liquid crystal panel includes a first light source 63 disposed on a top face 81 of a disk-like base 67A and a total of four second light sources 65E, 65F, 65G, and 65H with the optical axes of emission light set in directions roughly equal in the inclination angle θ in a direction orthogonal to the inclination direction of the angle φ from two virtual lines 62 inclined at the angle φ in the same plane from the front direction 57. The azimuth angle of the horizontal direction of the screen being defined as 0°, preferably, the second light sources 65E to 65H are disposed at an azimuth angle of 45°, 135°, 225° and 315° respectively.

Next, a control method of the backlight will be discussed.

If a white bright portion and a dark portion such as a shade under a tree, etc., are included on a screen as display content of the display screen, control is performed so that the bright portion and the dark portion become different in background intensity. That is, for the VA-mode liquid crystal panel, blue tint sometimes occurs in the black state when the screen is observed in the upper or downward oblique directions with polar angles; and thus, by emitting light with higher intensities of R and G colors than that of B color, such a blue tint can be eliminated. Such a characteristic can also be controlled monochrome; in the most practical use, the backlight unit is controlled so as to correct in response to the intensity because such a characteristic also exists in halftone characteristic.

For the backlight unit, the light emission surface may be divided into blocks and light emission control may be performed for each block.

Figure 12:
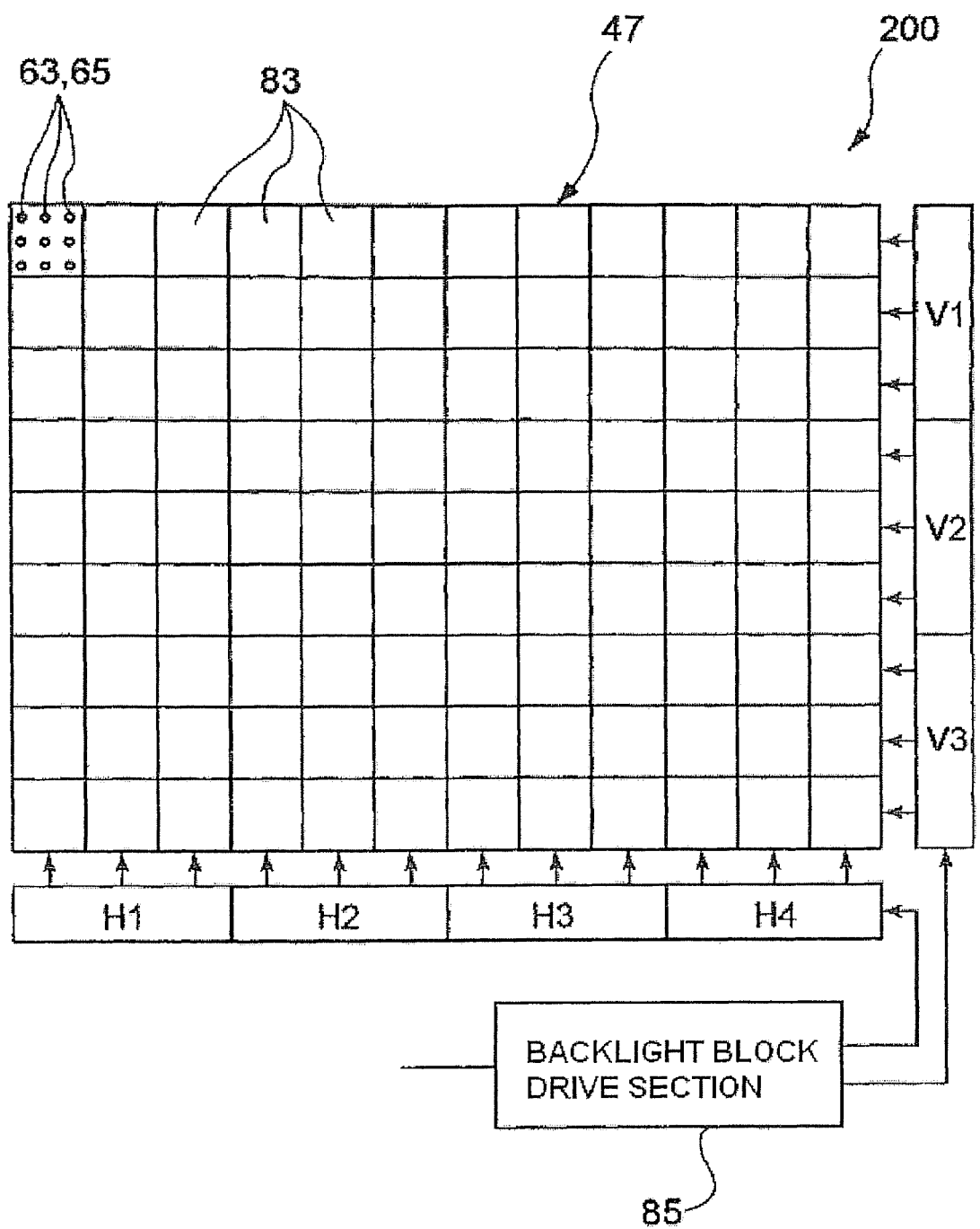
FIG. 12 is a drawing to show the configuration for performing light emission control of a light emission surface for each block.

FIG. 12 is a drawing to show the configuration for performing light emission control of the light emission surface for each block.

For the backlight unit 200, intensity is changed for each pixel (or for each block), whereby finer control is made possible. That is, the light emission surface 47 of the backlight unit 200 is divided into blocks 83 and the emission intensity setting section 53 of the light emission spectrum setting means sets the emission intensity of the first and second light sources 63 and 65 contained in each block 83 separately for each block 83. A backlight block drive section 85 performs drive control of vertical drive control sections $V_1$ to $V_3$ and horizontal drive control sections $H_1$ to $H_4$ each for driving a predetermined number of blocks 83. Such a configuration makes it possible to vary the light emission spectrum characteristic in response to each place of the light emission surface 47. Accordingly, it is made possible to selectively strongly correct the place where tinting is noticeable in the light emission surface.

Thus, in the backlight unit 200 making it possible to control the light emission spectrum in the block 83 units, when tint varies from one place of the light emission surface 47 to another, it is made possible to control the tint in the block units in response to the variation and fine control is made possible and the display image quality can be improved as compared with the case where the whole screen is uniformly processed. To display an image, the blocks of the backlight unit 200 can be properly controlled while they are synchronized with each other in response to information of the image color, intensity, etc., changing in time sequence.

Next, the configuration for correcting color shift using the optical compensation film of the liquid crystal display panel will be discussed.

In the embodiment, the configuration example including the multi-directional irradiation unit and the emission intensity setting section as the light emission spectrum setting means for separately setting the light emission spectra in the front direction and the oblique direction has been described; as the light emission spectrum setting means, in addition, the optical compensation film disposed on the display surface of the liquid crystal display panel can also be used or can be used in combination with the setting means. In this case, the optical compensation film has wavelength dependency and is set to transmittance varying in response to the light emission surface (screen) position. That is, a plurality of areas corresponding to roughly one pixel containing RGB are defined and the transmittance in the areas is set so that the transmittance of RGB is made roughly equal in the center of the display screen and the transmittance of B is set low in the upper and downward portions of the screen, for example, for the VA-mode liquid crystal panel. Also according to this, directivity and the emission intensity are controlled separately for each of the R, G, and B colors, the chromaticity (spectrum) is varied in the front direction and the oblique direction, and the viewing angle dependency of the color shift of the display screen can be improved.

Next, correction of color shift caused by temperature-humidity change will be discussed.

Generally, when temperature and relative humidity change, the phase difference of an optical compensation film in a liquid crystal display also changes due to expansion or shrinkage of the film or change in the stress from a polarizing plate, an adhesive, etc., and consequently change also occurs in displayed tint.

Then, a temperature-humidity sensor is installed on a liquid crystal panel and the BGR emission intensity ratio of LED is changed according to the values of temperature and relative humidity detected by the temperature-humidity sensor, so that occurring color shift can be corrected.

In the embodiment described above, only LED elements are used as the first light source and the second light sources, but a hybrid configuration containing fluorescent lights in addition to the LED elements may be adopted for the backlight unit according to the invention.

In the embodiment, adjustment for black, white display has been described by way of example; however, in the backlight unit according to the invention, adjustment can also be made to a different characteristic in halftones, and advantages similar to those described above can be provided.

EXAMPLES

The invention is described more concretely with reference to the following Examples, in which the material, the reagent and the substance used, their amount and ratio, and the details of the treatment may be suitably modified or changed not overstepping the spirit and the scope of the invention. Accordingly, the invention should not be limited to the Examples mentioned below.

Optical simulations for models of liquid crystal display devices were performed by using LCD Master (SHINTECH Inc.).

The simulation model was a transmissive 8-domain VA-mode liquid crystal cell. The constitution of the model was a "two-films symmetric type" constitution, that is, the constitution having two equivalent retardation films disposed at both sides of the liquid crystal cell. It was assumed that the two retardation films were disposed with their slow axes crossing at about 90°. It was also assumed that the polarizing element in the model showed the optical properties equal to those of a polarizing element used in a general product; and that the thickness of the liquid crystal cell in the model was 3.65 μm.

The displaying quality was studied in terms of (1) "brightness in the black state", (2) "gray scale property γ (average gamma of all gray scale)", and (3) "the color tone in the black state (the distance $\Delta u' v'$ from D65)".

And by combining the four factors shown below, the improvement effect of the above mentioned items was evaluated.

1. Employing a multi-gap (MG) structure LC cell or not;
2. Re(550) and Rth(550) of films;
3. Wavelength dispersion of films;
   constant: $\Delta Re_{630\text{-}450} = \Delta Rth_{630\text{-}450} = 0$ nm
   reversed: $\Delta Re_{630\text{-}450} = +4.2$ nm or $\Delta Rth_{630\text{-}450} = +8.4$ nm
   regular: $\Delta Re_{630\text{-}450} = -4.2$ nm or $\Delta Rth_{630\text{-}450} = -8.4$ nm
4. Employing an LED backlight or not;

It was assumed that the intensity of blue light in the upper and downward oblique directions with a polar angle of 60° emitted from this LED backlight was adjusted to the range from 5 to 500% of the intensity of green and red light.

The results are shown in Table. The symbols in the table mean as follows.

⊚: much better than the standard,
○: better than the standard,
Δ: equal to the standard, and
x: worse than the standard.

TABLE

| Example No. | Film Re nm | Rth nm | Δ Re *1 | Δ Rth *2 | MG *3 | BL *4 | Result *5 (1) | (2) | (3) | Evaluation *5 (1) | (2) | (3) |
|---|---|---|---|---|---|---|---|---|---|---|---|---|
| S | 40 | 120 | reg | reg | X | X | 1.54 | 1.10 | 0.054 | — | — | — |
| 1 | 20 | 60 | reg | reg | X | X | 9.14 | 1.14 | 0.027 | X | Δ | ○ |
| 2 | 20 | 80 | reg | reg | X | X | 5.44 | 1.17 | 0.025 | X | ○ | ◉ |
| 3 | 20 | 100 | reg | reg | X | X | 3.35 | 1.15 | 0.031 | X | ○ | ◉ |
| 4 | 20 | 120 | reg | reg | X | X | 2.96 | 1.07 | 0.027 | X | Δ | ○ |
| 5 | 20 | 140 | reg | reg | X | X | 4.28 | 0.92 | 0.017 | X | X | ◉ |
| 6 | 40 | 60 | reg | reg | X | X | 6.33 | 1.20 | 0.028 | X | ○ | ○ |
| 7 | 40 | 80 | reg | reg | X | X | 3.08 | 1.23 | 0.030 | X | ○ | ○ |
| 8 | 40 | 100 | reg | reg | X | X | 1.46 | 1.20 | 0.064 | Δ | ○ | X |
| 9 | 40 | 120 | reg | reg | X | X | 1.54 | 1.10 | 0.054 | Δ | Δ | Δ |
| 10 | 40 | 140 | reg | reg | X | X | 3.32 | 0.92 | 0.037 | X | X | ○ |
| 11 | 60 | 60 | reg | reg | X | X | 4.30 | 1.25 | 0.034 | X | ◉ | ○ |
| 12 | 60 | 80 | reg | reg | X | X | 1.62 | 1.27 | 0.024 | Δ | ◉ | ◉ |
| 13 | 60 | 100 | reg | reg | X | X | 0.58 | 1.23 | 0.104 | ◉ | ○ | X |
| 14 | 60 | 120 | reg | reg | X | X | 1.20 | 1.09 | 0.102 | ○ | Δ | X |
| 15 | 60 | 140 | reg | reg | X | X | 3.48 | 0.90 | 0.064 | X | X | X |
| 16 | 80 | 60 | reg | reg | X | X | 3.23 | 1.28 | 0.063 | X | ◉ | Δ |
| 17 | 80 | 80 | reg | reg | X | X | 1.23 | 1.28 | 0.124 | ○ | ◉ | X |
| 18 | 80 | 100 | reg | reg | X | X | 0.83 | 1.21 | 0.189 | ○ | ○ | X |
| 19 | 80 | 120 | reg | reg | X | X | 2.03 | 1.06 | 0.126 | X | Δ | X |
| 20 | 80 | 140 | reg | reg | X | X | 4.82 | 0.86 | 0.083 | X | X | X |
| 21 | 100 | 60 | reg | reg | X | X | 3.24 | 1.28 | 0.106 | X | ◉ | X |
| 22 | 100 | 80 | reg | reg | X | X | 1.98 | 1.25 | 0.158 | X | ◉ | X |
| 23 | 100 | 100 | reg | reg | X | X | 2.25 | 1.15 | 0.158 | X | ○ | X |
| 24 | 100 | 120 | reg | reg | X | X | 4.05 | 1.00 | 0.119 | X | X | X |
| 25 | 100 | 140 | reg | reg | X | X | 7.32 | 0.82 | 0.088 | X | X | X |
| 26 | 40 | 120 | 0 | 0 | X | X | 1.54 | 1.10 | 0.070 | Δ | Δ | X |
| 27 | 40 | 120 | rev | rev | X | X | 1.56 | 1.10 | 0.082 | Δ | Δ | X |
| 28 | 40 | 120 | reg | reg | ○ | X | 1.49 | 1.10 | 0.045 | Δ | Δ | Δ |
| 29 | 40 | 120 | reg | reg | X | ○ | 1.54 | 1.10 | 0.000 | Δ | Δ | ◉ |
| 30 | 40 | 100 | 0 | 0 | X | X | 1.51 | 1.20 | 0.038 | Δ | ○ | ○ |
| 31 | 60 | 100 | 0 | 0 | X | X | 0.59 | 1.23 | 0.078 | ◉ | ○ | X |
| 32 | 80 | 80 | 0 | 0 | X | X | 1.25 | 1.28 | 0.127 | Δ | ◉ | X |
| 33 | 80 | 100 | 0 | 0 | X | X | 0.81 | 1.21 | 0.165 | ○ | ○ | X |
| 34 | 40 | 100 | rev | rev | X | X | 1.57 | 1.20 | 0.010 | Δ | ○ | ◉ |
| 35 | 60 | 100 | rev | rev | X | X | 0.62 | 1.23 | 0.081 | ◉ | ○ | X |
| 36 | 80 | 80 | rev | rev | X | X | 1.29 | 1.29 | 0.137 | Δ | ◉ | X |
| 37 | 80 | 100 | rev | rev | X | X | 0.81 | 1.22 | 0.147 | ○ | ○ | X |
| 38 | 40 | 100 | reg | reg | ○ | X | 1.46 | 1.20 | 0.066 | Δ | ○ | X |
| 39 | 60 | 100 | reg | reg | ○ | X | 0.56 | 1.23 | 0.109 | ◉ | ○ | X |
| 40 | 80 | 80 | reg | reg | ○ | X | 1.25 | 1.28 | 0.104 | Δ | ◉ | X |
| 41 | 80 | 100 | reg | reg | ○ | X | 0.79 | 1.21 | 0.193 | ○ | ○ | X |
| 42 | 40 | 100 | reg | reg | X | ○ | 1.46 | 1.20 | 0.000 | Δ | ○ | ◉ |
| 43 | 60 | 100 | reg | reg | X | ○ | 0.58 | 1.23 | 0.000 | ◉ | ○ | ◉ |
| 44 | 80 | 80 | reg | reg | X | ○ | 1.23 | 1.28 | 0.000 | ○ | ◉ | ◉ |
| 45 | 80 | 100 | reg | reg | X | ○ | 0.83 | 1.21 | 0.000 | ○ | ○ | ◉ |
| 46 | 40 | 120 | 0 | 0 | ○ | X | 1.48 | 1.10 | 0.048 | Δ | Δ | Δ |
| 47 | 40 | 120 | rev | rev | ○ | X | 1.48 | 1.10 | 0.064 | Δ | Δ | X |
| 48 | 40 | 120 | 0 | 0 | X | ○ | 1.54 | 1.10 | 0.000 | Δ | Δ | ◉ |
| 49 | 40 | 120 | rev | rev | X | ○ | 1.56 | 1.10 | 0.000 | Δ | Δ | ◉ |
| 50 | 40 | 120 | reg | reg | ○ | ○ | 1.49 | 1.10 | 0.000 | Δ | Δ | ◉ |
| 51 | 40 | 100 | 0 | 0 | ○ | X | 1.49 | 1.20 | 0.050 | Δ | ○ | Δ |
| 52 | 60 | 100 | 0 | 0 | ○ | X | 0.56 | 1.23 | 0.070 | ◉ | ○ | X |
| 53 | 80 | 80 | 0 | 0 | ○ | X | 1.26 | 1.28 | 0.106 | Δ | ◉ | X |
| 54 | 80 | 100 | 0 | 0 | ○ | X | 0.76 | 1.22 | 0.167 | ◉ | ○ | X |
| 55 | 40 | 100 | rev | rev | ○ | X | 1.54 | 1.20 | 0.018 | Δ | ○ | ◉ |
| 56 | 60 | 100 | rev | rev | ○ | X | 0.58 | 1.23 | 0.060 | ◉ | ○ | Δ |
| 57 | 80 | 80 | rev | rev | ○ | X | 1.29 | 1.28 | 0.115 | Δ | ◉ | X |
| 58 | 80 | 100 | rev | rev | ○ | X | 0.75 | 1.22 | 0.145 | ◉ | ○ | X |
| 59 | 40 | 100 | 0 | 0 | X | ○ | 1.51 | 1.20 | 0.000 | Δ | ○ | ◉ |
| 60 | 60 | 100 | 0 | 0 | X | ○ | 0.59 | 1.23 | 0.000 | ◉ | ○ | ◉ |
| 61 | 80 | 80 | 0 | 0 | X | ○ | 1.25 | 1.28 | 0.000 | Δ | ◉ | ◉ |
| 62 | 80 | 100 | 0 | 0 | X | ○ | 0.81 | 1.21 | 0.000 | ○ | ○ | ◉ |
| 63 | 40 | 100 | rev | rev | X | ○ | 1.57 | 1.20 | 0.000 | Δ | ○ | ◉ |
| 64 | 60 | 100 | rev | rev | X | ○ | 0.62 | 1.23 | 0.000 | ◉ | ○ | ◉ |
| 65 | 80 | 80 | rev | rev | X | ○ | 1.29 | 1.29 | 0.000 | Δ | ◉ | ◉ |
| 66 | 80 | 100 | rev | rev | X | ○ | 0.81 | 1.22 | 0.000 | ○ | ○ | ◉ |
| 67 | 40 | 100 | 0 | 0 | ○ | ○ | 1.49 | 1.20 | 0.000 | Δ | ○ | ◉ |
| 68 | 60 | 100 | 0 | 0 | ○ | ○ | 0.56 | 1.23 | 0.000 | ◉ | ○ | ◉ |
| 69 | 80 | 80 | 0 | 0 | ○ | ○ | 1.26 | 1.28 | 0.000 | Δ | ◉ | ◉ |
| 70 | 80 | 100 | 0 | 0 | ○ | ○ | 0.76 | 1.22 | 0.000 | ◉ | ○ | ◉ |
| 71 | 40 | 100 | rev | rev | ○ | ○ | 1.54 | 1.20 | 0.000 | Δ | ○ | ◉ |

TABLE-continued

| Example No. | Film Re nm | Rth nm | Δ Re *1 | Δ Rth *2 | MG *3 | BL *4 | Result *5 (1) | (2) | (3) | Evaluation *5 (1) | (2) | (3) |
|---|---|---|---|---|---|---|---|---|---|---|---|---|
| 72 | 60 | 100 | rev | rev | ○ | ○ | 0.58 | 1.23 | 0.000 | ◎ | ○ | ◎ |
| 73 | 80 | 80 | rev | rev | ○ | ○ | 1.29 | 1.28 | 0.000 | Δ | ◎ | ◎ |
| 74 | 80 | 100 | rev | rev | ○ | ○ | 0.75 | 1.22 | 0.000 | ◎ | ○ | ◎ |

*1: $\Delta Re_{630-450}$ rev: $\Delta Re_{630-450} = +4.2$ nm reg: $\Delta Re_{630-450} = -4.2$ nm
*2: $\Delta Rth_{630-450} = 0$ nm rev: $\Delta Rth_{630-450} = +8.4$ nm reg: $\Delta Rth_{630-450} = -8.4$ nm
*3: employing a MG structure LC cell (○) or not (X)
*4: employing a backlight unit showing directionality regarding the emitting intensity of blue light (○) or not (X)
*5: (1) "brightness in the black state", (2) "gray scale property γ (average gamma of all gray scales)", and (3) "the color tone in the black state (the distance Δ u' v' from D65)".
*1: $\Delta Re_{630-450}$ rev: $\Delta Re_{630-450} = +4.2$ nm reg: $\Delta Re_{630-450} = -4.2$ nm
*2: $\Delta Rth_{630-450}$ rev: $\Delta Rth_{630-450} = +8.4$ nm reg: $\Delta Rth_{630-450} = -8.4$ nm
*3: employing a MG structure LC cell (○) or not (X)
*4: employing a backlight unit showing directionality regarding the emitting intensity of blue light (○) or not (X)
*5: (1) is "brightness in the black state", (2) is "gray scale property γ (average gamma of all gray scale)", and (3) is "the color tone in the black state (the distance Δ u' v' from D65)".

What is claimed is:

1. A VA-mode liquid crystal display device comprising:
a pair of polarizing elements;
a liquid crystal cell disposed between the pair of polarizing elements; and
an optical compensation film, having retardation in plane at a wavelength of 550 nm, Re(550), falling within the range from 20 to 100 nm, and retardation along thickness direction at a wavelength of 500 nm, Rth(550), falling within the range from 60 to 120 nm, disposed between the liquid crystal cell and each of the pair of polarizing elements; and
a backlight unit outside of one of the pair of polarizing elements, wherein
the backlight unit is a directly-beneath type backlight unit comprising;
a light emission surface,
a plurality of light sources placed below the light emission surface, and
light emission spectrum setting means for separately setting light emission spectra in a front direction which is parallel to the normal line direction relative to the light emission surface and in an oblique direction which is inclined at a predetermined angle from the normal line direction.

2. The VA-mode liquid crystal display device of claim 1, wherein the liquid crystal cell is a multi-domain liquid crystal cell.

3. The VA-mode liquid crystal display device of claim 1, wherein the liquid crystal cell is a multi-domain liquid crystal cell with eight domains per each pixel.

4. The VA-mode liquid crystal display device of claim 1, wherein the liquid crystal cell has a multi-gap structure.

5. The VA-mode liquid crystal display device of claim 1, wherein
the plurality of light sources are a plurality of LED light sources different in light emission color, each comprising a first light source with the front direction as an optical axis of emission light and a second light source with the oblique direction as the optical axis of emission light; and
the light emission spectrum setting means changes the emission intensity for the second light source for each light emission color.

6. The VA-mode liquid crystal display device of claim 5, wherein
each of the second light source has the optical axis of emission light, the optical axis being set in a direction which is inclined by a predetermined angle against the front direction and is in a plane parallel to the front direction.

7. The VA-mode liquid crystal display device of claim 5, wherein a backlight unit comprises a plurality of multi-directional irradiation units each having the LED elements of the first light source and the second light source combined in one are dispersed below the light emission surface.

8. The VA-mode liquid crystal display device of claim 7, wherein the multi-directional irradiation units of each of light emission colors are placed like a lattice.

9. The VA-mode liquid crystal display device of claim 1, wherein the light emission surface is divided into blocks, and wherein
said light emission spectrum setting means sets the emission intensity of the first and second light sources contained in each of the blocks separately for each block.

10. The VA-mode liquid crystal display device of claim 1; wherein a difference, $\Delta Re_{630-450}$, between retardation in plane at 630 nm, Re(630), and retardation in plane at 450 nm, Re(450), of the optical compensation film is from −10 nm to 10 nm; and a difference, $\Delta Rth_{630-450}$, between retardation along thickness direction at 630 nm, Rth(630), and retardation along thickness direction at 450 nm, Rth(450), of the optical compensation film is from −12 nm to 12 nm.

* * * * *